United States Patent [19]

Shamoto

[11] Patent Number: 4,783,161
[45] Date of Patent: Nov. 8, 1988

[54] MIRROR ANGLE ADJUSTING DEVICE FOR DOOR MIRROR ASSEMBLY

[75] Inventor: Noriyasu Shamoto, Aichi, Japan

[73] Assignee: Kabushiki Kaisha Tokai Rika Denki Seisakusho, Aichi, Japan

[21] Appl. No.: 95,163

[22] Filed: Sep. 11, 1987

[30] Foreign Application Priority Data

Sep. 11, 1986 [JP] Japan .................. 61-140213[U]

[51] Int. Cl.$^4$ .................. B60R 1/06; G02B 7/18; G02B 5/08
[52] U.S. Cl. .................. 350/635; 248/479
[58] Field of Search .............. 350/635, 632, 604, 606, 350/640; 248/479–481, 484, 549, 900

[56] References Cited

U.S. PATENT DOCUMENTS 4,422,724 12/1983 Otsuka et al. .
4,548,483 10/1985 Moro et al. .................. 350/635
4,660,944 4/1987 Suzuki et al. .................. 350/635

FOREIGN PATENT DOCUMENTS

2828873 1/1978 Fed. Rep. of Germany ...... 350/635
122047 6/1986 Japan .................. 350/635

Primary Examiner—Jon W. Henry
Attorney, Agent, or Firm—Birch, Stewart, Kolasch & Birch

[57] ABSTRACT

A mirror angle adjusting device for a door mirror assembly for use in motor vehicles has a control lever, and first, second, and third connecting members for sequentially transmitting to the mirror holder vertical and horizontal control movements of the lever for angle adjustment. Connections between the control lever and the first connecting member, between the first and second connecting members, between the second and third connecting members, and between the third connecting member and the mirror holder, permit smooth transmission of vertical and horizontal control movements of the lever to the individual members for mirror angle adjustment.

6 Claims, 5 Drawing Sheets

MIRROR ANGLE ADJUSTING DEVICE FOR DOOR MIRROR ASSEMBLY

BACKGROUND OF THE INVENTION

1. Field of the Invention

The present invention relates to a mirror angle adjusting device for a door mirror assembly for use, for example, in a motor vehicle wherein a mirror holder is rotatable about vertical and horizontal axes by pivotal operation of a manual lever for angular adjustment of a mirror supported in the mirror holder.

2. Prior Art

Figure 9:
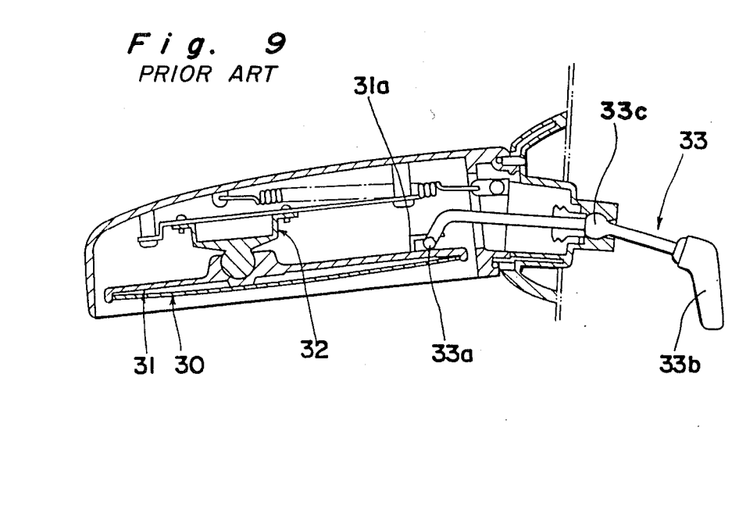
FIGS. 9 and 10 are, respectively, a partially sectional plan view showing a prior-art mirror angle adjusting device and an explanatory view illustrating a joint portion between a lever and a mirror holder in said device, as previously described.
Figure 10:
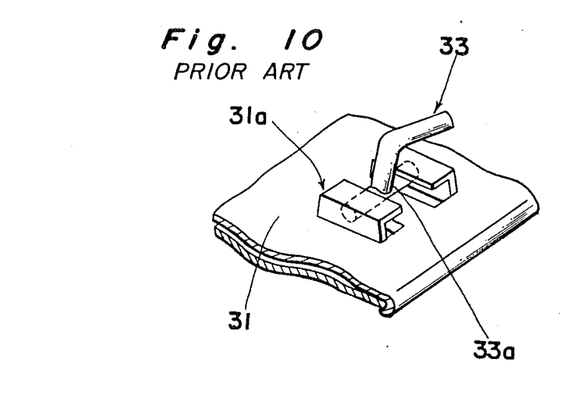

Various mirror angle adjusting arrangements have been known which are of the type that a mirror in a door mirror assembly is angularly adjusted through pivotal operation of a manual lever. One typical example of such an arrangement is illustrated in FIGS. 9 and 10. This prior art arrangement comprises a mirror 30 supported in a mirror holder 31. The mirror holder 31 is supported in a mirror holder supporting member 32 rotatably about two orthogonally intersecting axes, i.e. vertical and horizontal axes, for angular adjustment of the position of the mirror holder 31. A V-shaped lever 33 extends outwardly from a door of the vehicle and having its knee point 33c rotatably supported in a position of the door. The front end of said lever 33 is further bent toward the mirror holder side. The lever 33 further has a T-shaped joint portion 33a connected to a connecting box portion 31a of the mirror holder 31 at the back thereof slightly movably along the back of the mirror holder and rotatably about the axis of the joint portion 33a. The base end of said lever 33 projects into the vehicle interior to serve as a control element 33b.

According to such an arrangement, the lever 33 is manipulated to vertically pivot about the knee point 33c so that the mirror holder 31 is rotated about the horizontal axis for angular adjustment. On the other hand, the lever 33 is manipulated to pivot about the knee point 33c in the longitudinal direction of the vehicle so that the mirror holder 31 is rotated about the vertical axis for angular adjustment. The position of the mirror 30 is therefore angularly adjusted.

According to such an arrangement, however, the lever 33 is bent at both its intermediate portion and its front end and, therefore, if the lever 33 is rotated either upwardly or downwardly, for example, and if, with its position kept as such, the lever 33 is then shifted in a horizontal direction, the center of twist at the control element 33b side of the lever 33 and that at the front end joint 33a side of the lever 33 are widely different from each other. As a result, some excessive strain may be caused to pivotal operation of the lever 33, proper movement of the mirror 30 being thus hampered.

SUMMARY OF THE INVENTION

Accordingly, the present invention is intended to solve the above mentioned problem and has as its primary object the provision of a mirror angle adjusting device for a door mirror assembly which can smoothly and accurately adjust the angular position of a mirror through pivotal operation of a lever.

In order to accomplish this and other objects, the invention presents a mirror angle adjusting device for a door mirror assembly for use, for example, in a motor vehicle, comprising:

a lever including an intermediate pivot portion pivotally supported in a door mirror case, one end portion formed as a control element which is manually pivotable in both vertical and horizontal directions, and an opposite end portion located in the door mirror case and formed as a joint, said lever extending substantially horizontally, a first connecting member including an intermediate pivot portion supported in the door mirror case rotatably in a horizontal plane and pivotally in a vertical plane, one end portion formed as a first joint which is connected to said joint of the lever movably in the axial direction thereof and relatively bendably in both vertical and horizontal directions, and an opposite end portion formed as a second joint, said first connecting member extending substantially horizontally, a second connecting member having a lower end portion formed as a first joint which is pivotally connected in a vertical plane to said second joint of the first connecting member, and an upper end formed as a second joint, said second connecting member extending substantially vertically, and a third connecting member including a shaft portion connected to a back of a mirror holder for holding a mirror in place at either side, right or left, of the center of rotation of the mirror holder, said shaft portion extending substantially vertically, and a salient portion projecting rearwardly from said shaft portion and connected to said second joint of the second connecting member rotatably about both a vertical axis and a horizontal axis.

According to this arrangement, if the control element of the lever at one end thereof is pivoted downwardly, for example, the other end of the lever is moved upwardly in conjunction with the first joint of the first connecting member, and said first joint of the first connecting member is moved relative to the joint of the lever in the axial direction of said lever or of said first connecting member, whereby any bias present between the pivotal portion or fulcrum of the lever and the rotating shaft of the first connecting member is absorbed. Through this process of lever operation the second joint of the first connecting member is moved downwardly in conjunction with the second connecting member, and the salient portion of the third connecting member is caused to rotate about the second joint of the second connecting member. The mirror holder is thus rotated about a horizontal axis while any deviation in movement between the second and third connecting members is absorbed. If the control element of the lever is moved in one direction along a horizontal plane, the joint portion of the lever is moved integrally with the first joint of the first connecting member and in a direction opposite from said one direction, and said first joint of the first connecting member is moved relative to one end of the lever and in the axial direction of the lever or of the first connecting member, whereby any bias present between the pivotal portion of the lever and the rotational axis of the first connecting member is absorbed. Through this process of lever operation, the second joint of the first connecting member is rotated in said one direction in conjunction with the second connecting member, and the salient portion of the third connecting member is caused to rotate about the second joint of the second connecting member, whereupon the shaft portion rotates about its axis and relative to the mirror holder and the third connecting member rotates relative to the second connecting member and about the shaft on which it is rotatably supported. Thus, the mirror holder is rotated about a vertical shaft through the third connecting member while any deviation in rotational movement between the second and third connecting members is absorbed.

Unlike the conventional arrangement in which a mirror is tilted together with a mirror holder by means of one pivotable lever, the mirror angle adjusting device according to the present invention is of such an arrangement that the lever is connected to the mirror holder through three connecting members. Accordingly, if any deviation in rotational movement is caused between the lever and the mirror holder as a result of the difference in center of rotation between them, such deviation is absorbed by the individual joints provided between the lever and the first connecting member, between the first and second connecting members, and between the second and third connecting members. Therefore, the mirror holder can be rotated constantly about vertical and horizontal axes by pivotal operation of the lever. Thus, the device according to the present invention permits unrestrained, smooth, and accurate rotation of the mirror holder about vertical and horizontal axes through pivotal operation of the lever for effective mirror angle adjustment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof, with reference to the accompanying drawings which are given by way of illustration only, and thus, are not limitative of the present invention, and in which.

DETAILED DESCRIPTION OF THE INVENTION

Preferred embodiments of the invention will now be described in detail with reference to FIGS. 1 to 8, inclusive.

In one preferred embodiment of the present invention, as FIGS. 1, 2, 3, and 4 show, a mirror angle adjusting device for a door mirror assembly comprises a mirror holder 5 supporting a mirror 4 and which is supported tiltably about its spherical joint portion 5a and relative to a mirror case 11. A lever 1 for tilting the mirror holder 5 is pivotally supported in the mirror case 11 and connected to the mirror holder 5 through a first connecting member 2, a second connecting member 9, and a third connecting member 10. Thus, the mirror holder 5 can be tilted about the spherical joint portion 5a by pivoting the lever 1 in vertical and horizontal directions, the position of the mirror holder 5 being thus angularly adjusted. It is to be noted that this mirror angle adjusting device as shown in the drawings is of a stationary type such that a door mirror 7 is not tiltable relative to a door or the like. The lever 1, being of a rod shaped structure having a generally square sectional configuration, comprises a spherical joint portion 1b formed integrally with the rod structure at an axially median portion thereof, the spherical joint portion 1b being pivotally supported in a bracket 8 fixed to a door or the like, a lever control knob 1a fixed at one axial end of the lever 1, the rod structure being bent downwardly at the other end portion, a cylindrical joint 1c formed integrally with the rod structure at the extremity of said other end portion.

The first connecting member 2 comprises a connecting rod 2a bent in dog-leg pattern, the bent portion of the rod 2a being rotatably fixed to a pedestal 2b. The pedestal 2b is rotatably supported on a salient portion 8a of the bracket 8 as a part of the mirror case and has a pair of support walls 2c, 2c on the top. The bent portion of said connecting rod 2a is rotatably supported between said support walls 2c, 2c by means of a pin 12. At one end of the connecting rod 2a a spherical joint portion 2e is formed next to a narrow neck portion 2d. The spherical joint 2e is fitted in the joint portion 1c of the lever 1 axially movably and relatively rotatably therewith for interconnection. At the other end of the connecting rod 2a there is formed a box-shaped frame 2f which extends upwardly. Accordingly, the connecting rod 2a and the pedestal 2b are rotatable about the rotation axis of the latter integrally with each other. The box-shaped frame 2f of the connecting rod 2a has a horizontal, U-shaped section so that it can receive a second connecting member 9 which is of a square pillar configuration. The second connecting member 9 is rotatably supported at its lower end by a pin 13 for rotation relative to the box-shaped frame 2f. At the top of the second connecting member 9, a spherical joint 9b is formed next to a narrow neck portion 9a.

The third connecting member 10 comprises a shaft portion 10a connecting to the back of the mirror holder, and a plate portion 10b projecting from the shaft portion 10a on the rear side of the mirror holder. The shaft portion 10a is disposed at the back of the mirror holder 5 and at a location nearer to the vehicle than the spherical joint portion 5a in parallel relation to a vertical axis I, and is rotatably and vertically and rearwardly unreleasably supported by three clasping pawls 5b, 5b, 5b and vertical dislocation stop pawls 5c, 5c. The plate portion 10b is formed integrally with the shaft portion 10 along the length thereof and has a recessed portion 10c in which one of the clasping pawls 5b is located. At the rear end of the plate portion 10b a clasping stand 10d is formed having a clasping portion 10e opening downwardly, in which the spherical portion 9b of the second connecting member 9 is unreleasably supported so that the second connecting member 9 is vertically and horizontally movable in integral relation with the clasping portion 10e, while the clasping portion 10e is rotatable about the spherical portion 9b.

Figure 2:
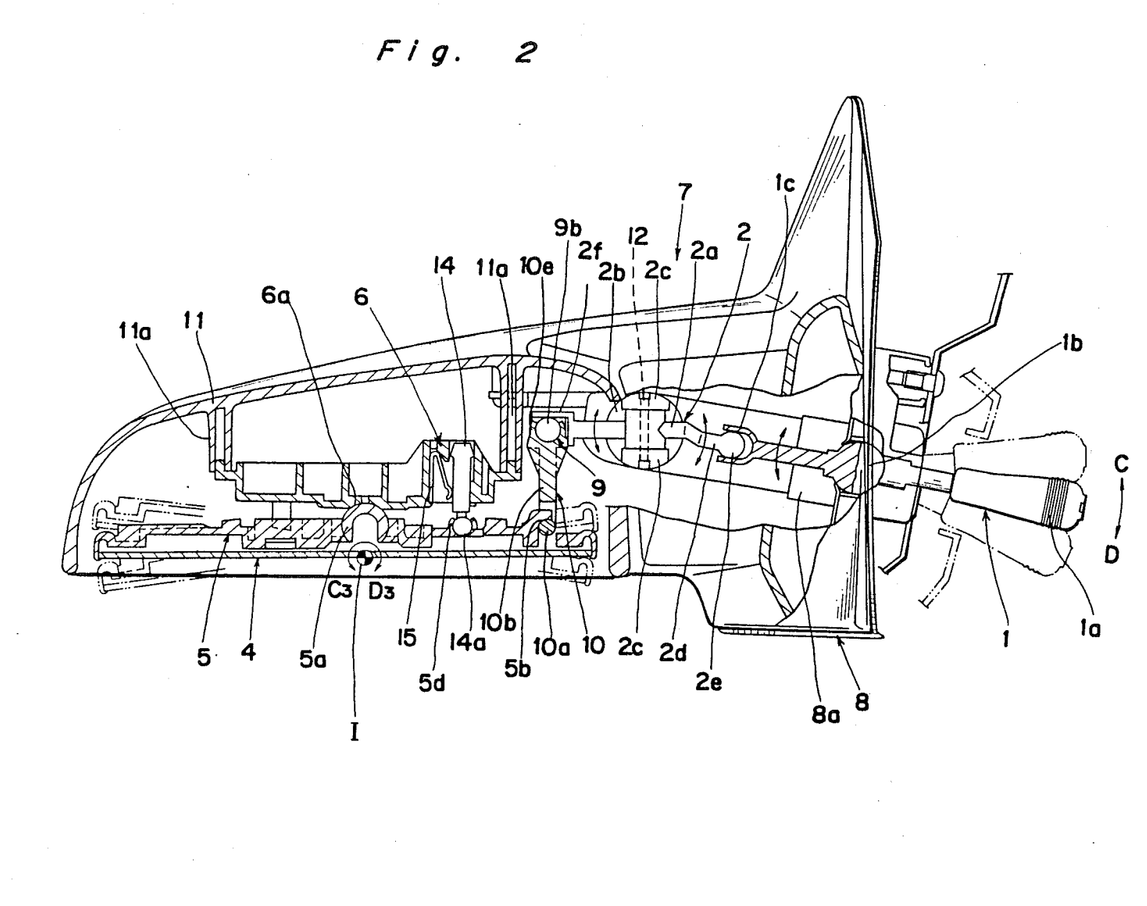
FIGS. 2, 3, and 4 are, respectively, a partially sectional plan view, a partially sectional side view, and a partially sectional front elevation, of said adjusting device.
Figure 3:
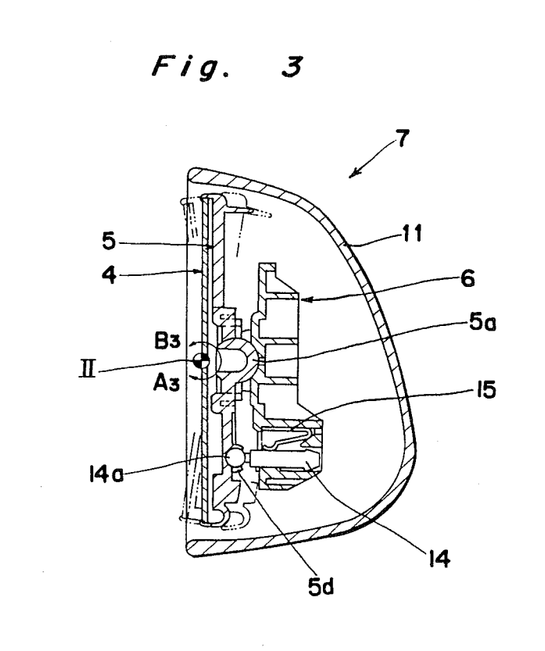
Figure 4:
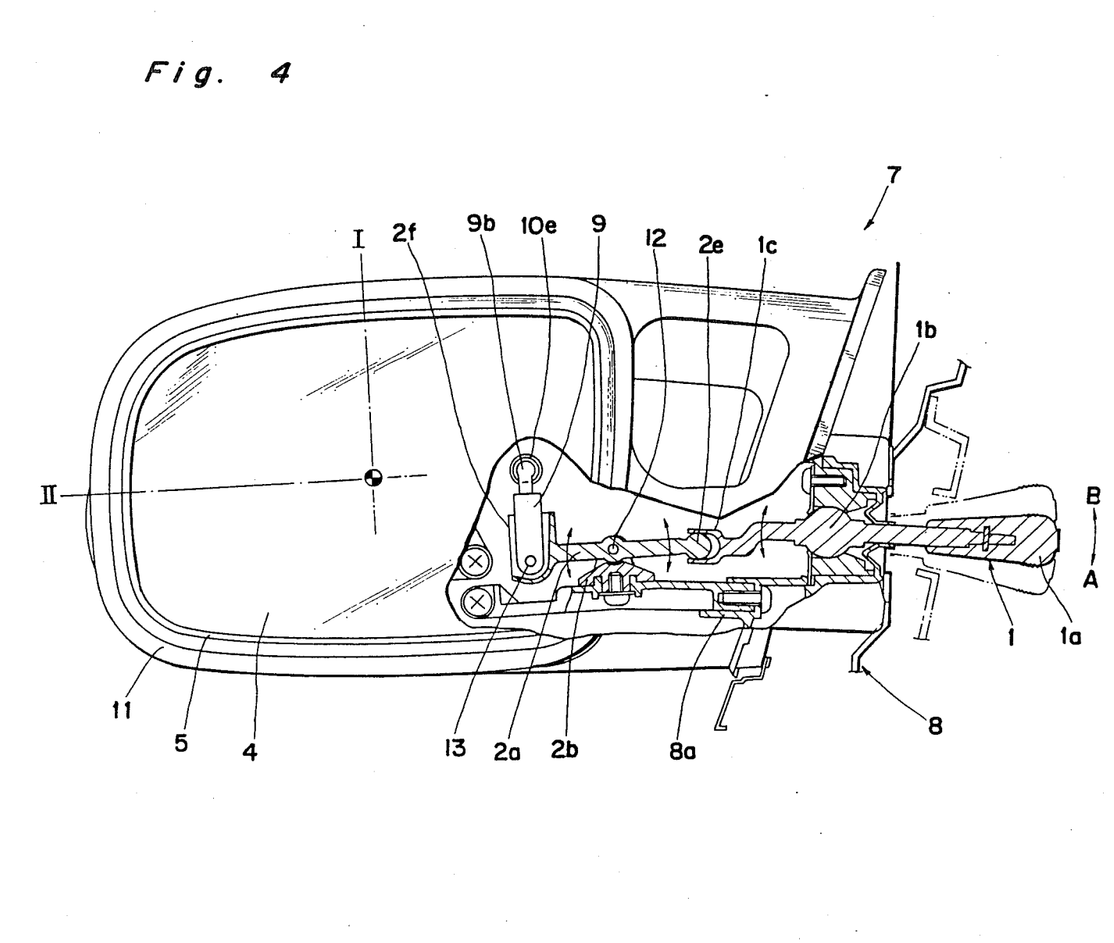

The door mirror case 11 has, as FIG. 2 shows, projections 11a, 11a therein, by means of which a mirror holder supporting member 6 is fixed in position. The mirror holder 5 is supported in position at the front end side of the mirror holder supporting member 6. The mirror 4 is fixed in position on the front side of the mirror holder 5. As stated earlier, the mirror holder 5 has a spherical portion 5a integrally formed therewith at the center of its rear side. This spherical portion 5a of the mirror holder 5 is fitted into a spherical portion receiver 6a provided in the mirror holder supporting member 6 so that the mirror holder 5 is rotatable about both vertical axis I and a horizontal axis II in relation to the mirror holder supporting member 6. At locations adjacent the spherical portion 5a on the back side of the mirror holder 5 and on the vertical and horizontal axes I and II of the holder 5 clasping portions 5d are formed. Also, guide rods 14 are and there are movably provided on the mirror holder side in opposed relation to the individual clasping portions 5d of the mirror holder supporting member 6. Each guide rod 14 is formed at the front end thereof with a spherical portion 14a which is claspedly supported in one corresponding clasping portion 5d, so that the mirror holder 5 is prevented from being rotated about its spherical portion along the mirror surface and so that the mirror holder 5 is smoothly guided for rotation about the vertical and horizontal axes I and II. In the figures, numeral 15 is a leaf spring for biasing the side of each guide rod 14 against the mirror holder supporting member 6 in order to give a certain degree of resistance against the movement of each guide rod 14.

The manner of operation of the above described mirror angle adjusting device will be explained herebelow.

Figure 1:
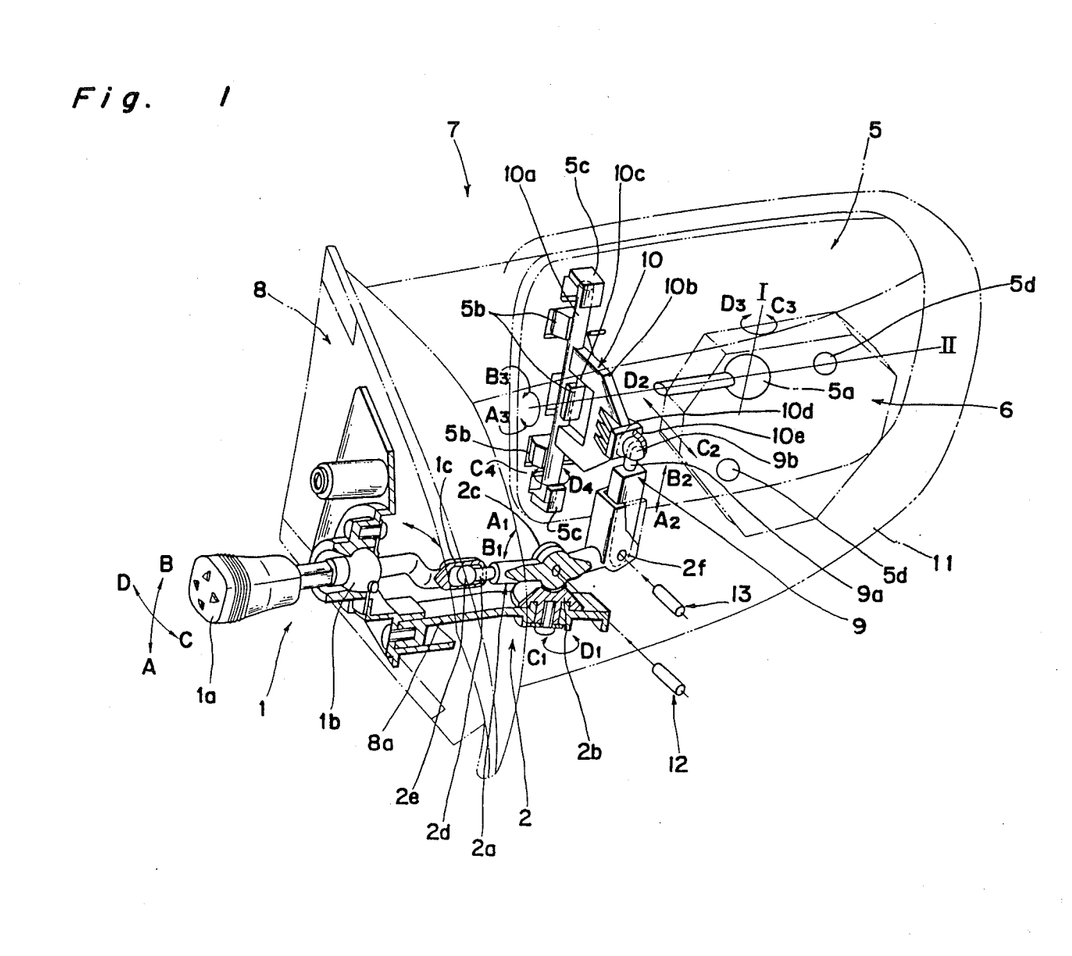
FIG. 1 is a perspective view showing a mirror angle adjusting device for a door mirror assembly according to one embodiment of the present invention.

If, as FIG. 1 shows, the knob 1a of the lever 1 is pivoted about the spherical portion 1b in downward direction A, the joint 1c at the front end of the lever 1 is pivoted upwardly in FIG. 1 in conjunction with the spherical joint 2e of the first connecting member 2, and said spherical joint 2e is slightly moved relative to the joint portion 1c of the lever 1 in the axial direction thereof. Thus the spherical portion 2e is pushed in the upward direction $A_1$ while any deviation in rotational movement between the lever 1 and the first connecting member 2 is absorbed. As a result, the second connecting member 9 is pushed in downward direction $A_2$ in conjunction with the box-shaped frame 2f of the first connecting member 2, and the clasping portion 10e of the third connecting member 10 is rotated about the spherical joint 9b of the second connecting member 9, so that the mirror 5 is rotated about the horizontal axis II in a direction $A_3$.

Conversely, if the knob 1a of the lever 1 is pivoted about the spherical portion 1b in upper direction B, the front end joint portion 1c of the lever 1 is pivoted downwardly in FIG. 1 in conjunction with the spherical joint 2e of the first connecting member 2, and said spherical joint 2e is slightly shifted relative to the joint portion 1c of the lever 1 in the axial direction thereof, so that the spherical joint 2e is pushed in downward direction $B_1$ while any inconsistency in rotational movement between the lever 1 and the first connecting member 2 is absorbed. As a result, the box-shaped frame 2f of the first connecting member 2 is moved in upward direction $B_2$, and the clasping portion 10e of the third connecting member 10 is rotated about the spherical portion 9b of the second connecting member 9, so that the mirror 5 is rotated about the horizontal axis II in $B_3$ direction while any inconsistency in rotational movement between the second and third connecting members 9, 10 is absorbed. Any inconsistency in rotational movement which may arise between the second and third connecting members 9, 10 when the knob 1a of the lever 1 is pivoted in aforesaid directions A and B can be explained by the fact that the center of rotation of the second connecting member 9 corresponds to the center of rotation of the pin 12 of the first connecting member 2, whereas the center of rotation of the third connecting member 10 corresponds to the horizontal axis II of the mirror holder 5. In other words, such inconsistency or deviation is due to a variation of rotational movement about the pin 12 from that about the horizontal axis II.

If the knob 1a of the lever 1 is pivoted about the spherical portion 1b in direction C, the front end joint portion 1c of the lever 1 is rotated and the spherical portion 2e of the first connecting member 2 is slightly shifted relative to said joint portion 1c in the axial direction thereof, so that said spherical portion 2e is rotated about the rotation axis of the pedestal 2b in direction $C_1$. Accordingly, the box-shaped frame 2f is also rotated in direction $C_1$. Since the second and third connecting members 9, 10 are rotatably connected to each other, the mirror holder 5 is therefore pulled backwardly in direction $C_2$ for movement, so that the clasping portion 10e of the third connecting member 10 is rotated about the spherical portion 9b of the second connecting member 9 and so that the shaft portion 10a is rotated about the axis thereof relative to the mirror holder 5 in direction $C_4$. Also, the third connecting member 10 is rotated about the pin 13 relative to the box-shaped frame 2f of the second connecting member 9. Thus, the mirror holder 5 is rotated about the vertical axis I in direction $C_3$ while any variation in rotational movement between the second and third connecting members 9, 10 is absorbed.

If the knob 1a of the lever 1 is pivoted about the spherical portion 1b in direction D, the front end joint portion 1c of the lever 1 is rotated and the spherical joint 2e of the first connecting member 2 is slightly shifted relative to the joint portion 1c in the axial direction thereof, so that said spherical joint portion 2e is rotated about the rotation axis of the pedestal 2b in direction $D_1$ while any variation in rotational movement between the lever 1 and the first connecting member 2 is absorbed. Accordingly, the box-shaped frame 2f is also rotated in Direction $D_1$. Since the second and third connecting members 9, 10 are rotatably connected to each other, the mirror holder 5 is therefore pressed backwardly in direction $D_2$, so that the clasping portion 10e of the third connecting member 10 is rotated about the spherical portion 9b of the second connecting member 9 and so that the shaft portion 10a is rotated about the axis thereof relative to the mirror holder 5 in direction $D_4$. Also, the third connecting member 10 is rotated about the pin 13 in relation to the box-shaped frame 2f of the second connecting member 9. Thus, the mirror holder 5 is rotated about the vertical axis I in direction $D_3$ while any variation in rotational movement between the second and third connecting member 9, 10 is absorbed. Any inconsistency in rotational movement which may arise between the second and third connecting members 9, 10 when the knob 1a of the lever 1 is pivoted in directions C and D can be explained by the fact that the center of rotation of the second connecting member 9 corresponds to the center of rotation of the pedestal 2b of the first connecting member 2, whereas the center of rotation of the third connecting member 10 corresponds to the vertical axis I of the mirror holder 5. In other words, such inconsistency or deviation is due to a variation of rotational movement about the axis of the pedestal 2b from that about the vertical axis I.

According to the above described embodiment, instead of tilting the mirror 4 together with the mirror holder 5 solely by one pivotable lever 1, the lever 1 is connected to the mirror holder 5 through three connecting members 2, 9, 10 so that if any variation in rotational movement is caused between the lever 1 and the mirror holder 5 because of the difference in center of rotation between them, such variation between individual connecting members 2, 9, 10 can be absorbed by means of the respective joint portions of the connecting members 2, 9, 10. Therefore, the mirror holder 5 can be rotated constantly about the vertical and horizontal axes smoothly, accurately, and without any restraint.

It is to be understood that the scope of the invention is not limited by the above described embodiment and may be carried out in various other forms. For example, the lever 1 is provided with a spherical portion at said other end thereof and the first connecting member 2 is provided with a cylindrical joint portion at one end thereof, whereby the lever 1 and the first connecting member 2 are connected to each other.

Figure 5:
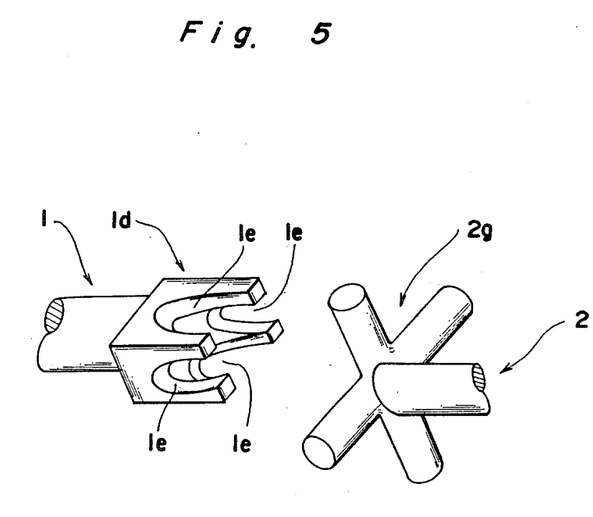
FIG. 5 is an exploded perspective view showing a joint portion between a lever and a first connecting member according to another embodiment of the present invention.
Figure 6:
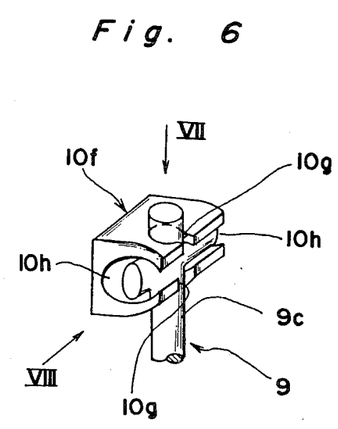
FIG. 6 is a perspective view showing a joint portion between a second connecting member and a third connecting member according to a still another embodiment of the present invention.
Figure 7:
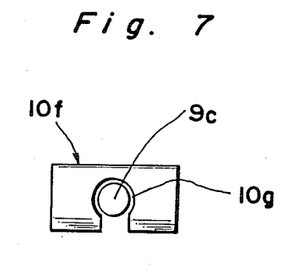
FIGS. 7 and 8 are a top plan view and a side elevation, respectively, viewed in directions indicated by arrows VII and VIII in FIG. 6.
Figure 8:
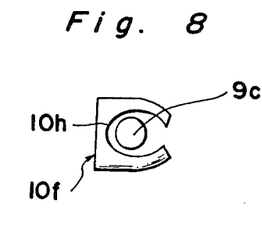

It is also possible that, as FIG. 5 shows, the lever 1 is provided at the other end thereof with a box-shaped joint 1d having notch grooves 1e, . . . , 1e on four sides, while the first connecting member 2 is provided at one end thereof with a cross shaft portion 2g, so that the cross shaft portion 2g is rotatably fitted in the grooves 1e, . . . , 1e to form a so called gimbal joint by which the lever 1 and the first connecting member 2 are connected to each other. Such cross shaft portion 2g may be provided on the lever side and such box-shaped joint 1d on the first connecting member side. Further, as FIGS. 6-8 show, the second connecting member 9 may be provided with a cross shaft portion 9c in place of the spherical joint 9b, and the clasping portion 10e may comprise a box-shaped joint 10f having notch grooves 10g, 10g, 10h, 10h on four sides, so that the cross shaft portion 9c is rotatably and unshiftably fitted in the grooves 10g, 10g, while the cross shaft portion 9c is rotatably and shiftably fitted in the grooves 10h, 10h, whereby the second connecting member 9 is connected to the third connecting member 10 for rotation about the vertical axis thereof and also for integral movement in both vertical and horizontal directions. For connections between the individual members, any other arrangement than those above described may be employed if it can function in the same manner as in the above described embodiment.

The present invention will become more fully understood from the detailed description given hereinbelow and the accompanying drawings which are given by way of illustration only, and thus are not limitative of the present invention, and wherein:

What is claimed is:

1. A mirror angle adjusting device for a door mirror assembly comprising:

a lever including an intermediate pivot portion pivotally supported in a door mirror case, one end portion formed as a control element which is manually pivotable in both vertical and horizontal directions, and an opposite end portion located in the door mirror case and formed as a joint, said lever extending substantially horizontally;

a first connecting member including an intermediate pivot portion supported in the door mirror case rotatably in a horizontal plane and pivotally in a vertical plane, one end portion formed as a first joint which is connected to said joint of the lever movably in the axial direction thereof and relatively bendably in both vertical and horizontal directions, and an opposite end portion formed as a second joint, said first connecting member extending substantially horizontally;

a second connecting member having a lower end portion formed as a first joint which is pivotally connected in a vertical plane to said second joint of the first connecting member, and an upper end formed as a second joint, said second connecting member extending substantially vertically; and a third connecting member including a shaft portion connected to a back of a mirror holder for holding a mirror in place at either side of the center of rotation of the mirror holder, said shaft portion extending substantially vertically, and a salient portion projecting rearwardly from said shaft portion and connected to said second joint of the second connecting member rotatably about both a vertical axis and a horizontal axis.

2. The mirror angle adjusting device for a door mirror assembly as set forth in claim 1, wherein either one of said joint of said lever and said first joint of said first connecting member has a cylindrical portion extending in the axial direction thereof, while the other of said joint of said lever and said first joint of said first connecting member has a spherical portion rotatable in said cylindrical portion and movable in the axial direction thereof.

3. The mirror angle adjusting device for a door mirror assembly as set forth in claim 1, wherein either one of said joint of said lever and said first joint of said first connecting member is in the form of a box-shaped frame having notch grooves at four sides thereof, while the other of said joint of said lever and said first joint of said first connecting member is in the form of a cross shaft rotatably fitted in said notch grooves.

4. The mirror angle adjusting device for a door mirror assembly as set forth in claim 1, wherein said mirror case has a bracket disposed in position therein, a pedestal being supported in said bracket for rotation about a vertical axis, said intermediate pivot portion of said first connecting member being pivotally supported on said pedestal in a vertical plane.

5. The mirror angle adjusting device for a door mirror assembly as set forth in claim 1, wherein said second joint of said first connecting member is in the form of a box-shaped frame, the lower end of said second connecting member being fitted in said box-shaped frame and rotatably supported therein so that the upper end of said second connecting member is pivotally movable in a vertical plane.

6. The mirror angle adjusting device for a door mirror assembly as set forth in claim 1, wherein said second joint of said second connecting member has a spherical portion and wherein said salient portion of said third connecting member has means for clasping and rotatably supporting said spherical portion.

* * * * *